US012770800B2

(12) United States Patent
Kawamura et al.

(10) Patent No.: US 12,770,800 B2
(45) Date of Patent: Oct. 20, 2026

(54) SOLID ELECTROLYTIC CAPACITOR

(71) Applicant: Panasonic Intellectual Property Management Co., Ltd., Osaka (JP)

(72) Inventors: Naoya Kawamura, Kyoto Fu (JP); Hitoshi Fukui, Nara Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 18/962,950

(22) Filed: Nov. 27, 2024

(65) Prior Publication Data

US 2025/0087424 A1 Mar. 13, 2025

Related U.S. Application Data

(63) Continuation of application No. PCT/JP2023/020255, filed on May 31, 2023.

(30) Foreign Application Priority Data

May 31, 2022 (JP) ................................ 2022-088857

(51) Int. Cl.
*H01G 9/012* (2006.01)
*H01G 9/028* (2006.01)
(Continued)

(52) U.S. Cl.
CPC ............ *H01G 9/012* (2013.01); *H01G 9/028* (2013.01); *H01G 9/10* (2013.01); *H01G 9/15* (2013.01)

(58) Field of Classification Search
CPC ........... H01G 9/012; H01G 9/08; H01G 9/10; H01G 9/15
See application file for complete search history.

(56) References Cited

U.S. PATENT DOCUMENTS

2019/0392996 A1* 12/2019 Navratil ................... H01G 9/08
2020/0365332 A1* 11/2020 Tezuka ................... H01G 9/012
(Continued)

FOREIGN PATENT DOCUMENTS

JP H02-088227 U1 7/1990
JP 2010-087308 A 4/2010
(Continued)

OTHER PUBLICATIONS

International Search Report dated Aug. 22, 2023 issued in International Patent Application No. PCT/JP2023/020255, with English translation.

*Primary Examiner* — Nathan Milakovich
(74) *Attorney, Agent, or Firm* — Rimon P.C.

(57) ABSTRACT

A disclosed solid electrolytic capacitor includes a capacitor element, a lead terminal and a lead terminal that are electrically connected to the capacitor element, and an exterior body that seals a portion of the lead terminal, a portion of the lead terminal, and the capacitor element. The exterior body includes a resin part containing a resin. The resin has a glass transition point Tg of 140° C. or less, where the glass transition point Tg is a temperature of the resin part at which a loss modulus measured by nanoscale dynamic viscoelastic measurement using a nanoindentation method changes from an increasing state to a decreasing state. The hardness of the resin part measured by the nanoindentation method is 0.08 GPa or less in a temperature range from the glass transition point Tg to 260° C. inclusive.

7 Claims, 2 Drawing Sheets

(51) Int. Cl.
*H01G 9/10* (2006.01)
*H01G 9/15* (2006.01)

(56) References Cited

U.S. PATENT DOCUMENTS

| | | | | |
|---|---|---|---|---|
| 2023/0307191 | A1 | 9/2023 | Yamada et al. | |
| 2026/0155315 | A1* | 6/2026 | Ueda ........................ | H01G 9/08 |
| 2026/0179857 | A1* | 6/2026 | Kusakabe ................ | H01G 9/10 |

FOREIGN PATENT DOCUMENTS

| | | | |
|---|---|---|---|
| JP | 2021-528851 | A | 10/2021 |
| WO | 2022/059459 | A1 | 3/2022 |

* cited by examiner

SOLID ELECTROLYTIC CAPACITOR

CROSS REFERENCE TO RELATED APPLICATION

The present application is a Continuation of International Application No. PCT/JP2023/020255, filed on May 31, 2023, which claims the benefit of priority of Japanese Patent Application No. 2022-088857, filed on May 31, 2022 in the Japan Patent Office, and the entire contents of the patent application are hereby incorporated by reference.

TECHNICAL FIELD

The present disclosure relates to a solid electrolytic capacitor.

BACKGROUND

Solid electrolytic capacitors have a low equivalent series resistance (ESR) and excellent frequency characteristics, and are therefore mounted in a variety of electronic devices. A solid electrolytic capacitor includes a capacitor element, lead terminals that are electrically connected to the capacitor element, and an exterior body that seals portions of the lead terminals and the capacitor element. Using a solid conductive polymer as an electrolyte contained in the capacitor element allows the solid electrolytic capacitor to exhibit a low ESR and excellent frequency characteristics.

A solid electrolytic capacitor is generally soldered to a substrate through a reflow process in which the capacitor is exposed to high temperatures. During this process, cracks may form in the exterior body due to thermal stress, thereby reducing the sealing performance of the exterior body. When the sealing performance is reduced, the conductive polymer contained in the solid electrolyte layer may be oxidized and deteriorated by moisture or oxygen that has intruded into the solid electrolytic capacitor. Accordingly, the conductivity of the solid electrolyte layer is decreased, which causes a reduction in the electrostatic capacitance of the solid electrolytic capacitor and an increase in the ESR. Therefore, various solid electrolytic capacitors have been proposed with the aim of improving the sealing performance of the exterior body.

For example, Japanese Laid-Open Patent Publication No. 2021-528851 discloses "a solid electrolytic capacitor including: a capacitor element that contains a sintered porous anode body, a dielectric that overlies the anode body, and a solid electrolyte that overlies the dielectric; an anode lead extending from a surface of the capacitor element; an anode termination that is in electrical connection with the anode lead and a cathode termination that is in electrical connection with the solid electrolyte; and a casing material that encapsulates the capacitor element and anode lead, wherein the casing material is formed from a curable resinous matrix that has a coefficient of thermal expansion of about 42 ppm/° C. or less at a temperature above the glass transition point of the resinous matrix; wherein the capacitor exhibits an initial equivalence series resistance of about 200 milliohms or less as determined at an operating frequency of 100 kHz and temperature of 23° C., and wherein the ratio of the equivalence series resistance of the capacitor after being exposed to a temperature of 125° C. for 560 hours to the initial equivalence series resistance of the capacitor is about 2.0 or less".

SUMMARY

In a solid electrolytic capacitor at high temperatures, the exterior body, the capacitor element, the lead terminals, and the like may cause thermal expansion and contraction. The exterior body seals the capacitor element and also seals portions of the lead terminals, so that the exterior body is placed under stress from the capacitor element and stress from the lead terminals. This makes it easier for cracks to form in the exterior body. At the same time, cracks and peeling are also likely to form at the interface between the exterior body and the capacitor element, and at the interface between the exterior body and the lead terminals.

In order to suppress the formation of cracks and peeling resulting from these internal stresses and improve the sealing performance of the exterior body, there are conventional techniques for reducing the thermal expansion and thermal contraction of the exterior body. However, depending on the correlation between the thermal expansion coefficient of the exterior body and the thermal expansion coefficients of the capacitor element and the lead terminals that are the adherends, such techniques may increase the internal stress. Thus, the conventional techniques are insufficient as technical measures. Therefore, it is important to specify the material properties of the exterior body that solely contribute to the internal stress (that is, the elastic modulus and hardness of the exterior body) in order to suppress the cracks and peeling that may occur at the interfaces between the exterior body and the capacitor element and the lead terminals, and to improve the sealing performance of the exterior body.

In light of these circumstances, an object of the present disclosure is to provide a solid electrolytic capacitor that has high heat resistance and excellent sealing performance of its exterior body even at high temperatures.

The present disclosure relates to a solid electrolytic capacitor. The solid electrolytic capacitor includes a capacitor element, a lead terminal electrically connected to the capacitor element, and an exterior body that seals the capacitor element and a portion of the lead terminal. The exterior body includes a resin part containing a resin. The resin has a glass transition point Tg of 140° C. or less where the glass transition point Tg is defined as a temperature of the resin part at which a loss modulus measured by nanoscale dynamic viscoelastic measurement using a nanoindentation method changes from an increasing state to a decreasing state. The hardness of the resin part measured by the nanoindentation method is 0.08 GPa or less in a temperature range from the glass transition point Tg to 260° C. inclusive.

The matters described in any two or more claims selected from among the appended claims may be combined as long as such combinations are possible. In addition, any configurations in embodiments may be combined as long as such combinations are possible.

According to the present disclosure, it is possible to obtain a solid electrolytic capacitor with excellent heat resistance.

Novel features of the present invention are set forth in the appended claims. The present invention, both in terms of structure and content, together with other objects and features of the present invention, will be better understood from the following detailed description taken in conjunction with the drawings.

DETAILED DESCRIPTION

Figure 1:
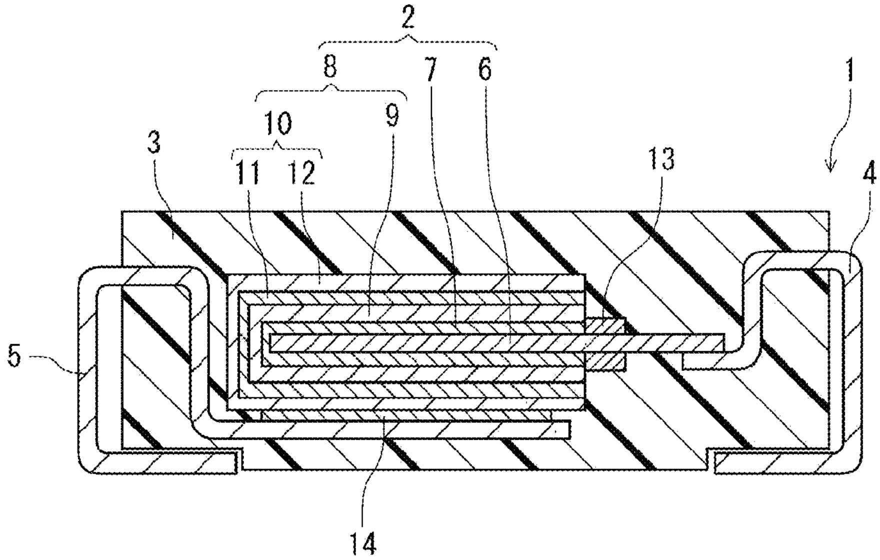
FIG. 1 is a longitudinal cross-sectional view schematically illustrating a solid electrolytic capacitor according to an embodiment of the present disclosure.

Hereinafter, embodiments according to the present disclosure will be described taking examples. However, the present disclosure is not limited to the examples described below. In the following description, specific numerical values and materials may be exemplified, but other numerical values and other materials may also be applied as long as the invention according to the present disclosure can be implemented. The description “numerical value A to numerical value B” herein includes numerical value A and numerical value B and can be read as “numerical value A or more and numerical value B or less”. In the following description, if lower limits and upper limits of a numerical value related to a specific physical property or condition are exemplified, any of the exemplified lower limits and any of the exemplified upper limits can be combined as long as the lower limit is not equal to or greater than the upper limit.

A solid electrolytic capacitor according to the present embodiment includes a capacitor element, a lead terminal that is electrically connected to the capacitor element, and an exterior body that seals the capacitor element and a portion of the lead terminal. The exterior body includes a resin part containing a resin. The resin may be referred to as “resin (R)” below. The resin (R) has a glass transition point Tg of 140° C. or less where the glass transition point Tg is defined as a temperature at which the loss modulus of the resin part measured by nanoscale dynamic viscoelastic measurement using a nanoindentation method changes from an increasing state to a decreasing state. In addition, in a temperature range from the glass transition point Tg to 260° C. inclusive, the hardness of the resin part measured by the nanoindentation method (in other words, the hardness of the resin part obtained when the resin part is measured by the nanoindentation method) is 0.08 GPa or less. In another aspect, in a temperature range from 140° C. to 260° C. inclusive, the hardness of the resin part measured by the nanoindentation method may be 0.08 GPa or less.

As described above, in order to improve the heat resistance of a solid electrolytic capacitor, it is important to suppress cracks and peeling that may occur at the interfaces between the exterior body and the capacitor element and lead terminals. As a result of investigation, the inventors of the present application have newly discovered that the stress applied to the exterior body from the capacitor element and lead terminals can be relieved by controlling the glass transition point Tg of the resin (R) contained in the exterior body and the hardness of the resin part containing the resin (R).

When the resin having the glass transition point Tg is heated, the resin changes from a glass state to a rubber state at the glass transition point Tg. The resin (R) contained in the exterior body of the solid electrolytic capacitor according to the present embodiment has a glass transition point Tg of 140° C. or less, and becomes rubbery in the temperature range from the glass transition point Tg to 260° C. inclusive. In this temperature range, the resin part containing the resin (R) has a low hardness of 0.08 GPa or less as measured by the nanoindentation method.

A solid electrolytic capacitor is generally exposed to high temperatures (for example, temperatures in the range of 180° C. to 260° C.) during a reflow process or the like. In addition, a solid electrolytic capacitor may also be used at high temperatures. When a solid electrolytic capacitor is exposed to high temperatures, the members of the solid electrolytic capacitor thermally expand. However, since the respective thermal expansion coefficients of the members are different, thermal stress occurs inside the solid electrolytic capacitor. Accordingly, when a conventional solid electrolytic capacitor is exposed to high temperatures, cracks and peeling are likely to occur at the interface between the exterior body and the capacitor element and the interface between the exterior body and the lead terminals.

When the solid electrolytic capacitor according to the present embodiment is exposed to a temperature that is equal to or higher than the glass transition point Tg, the resin (R) contained in the exterior body becomes rubbery, and the hardness of the resin part containing the resin (R) becomes as sufficiently low as 0.08 GPa or less. Therefore, the exterior body can relieve the stress from the capacitor element and the lead terminals by distributing the same throughout the exterior body. This makes it possible to suppress the occurrence of cracks inside the exterior body and also suppress cracks and peeling that may occur at the interfaces between the exterior body and the capacitor element and the lead terminals. As described above, the solid electrolytic capacitor according to the present embodiment has high sealing performance of the exterior body even at high temperatures, and has excellent heat resistance.

(Resin Part)

The resin part includes the resin (R). The resin part may be constituted of only the resin (R), or may include components other than the resin (R). Examples of components other than the resin (R) include a curing aid (curing accelerator), a low stress agent (softener), a release agent, a coupling agent, a colorant, an ion scavenger, and the like. The proportion of the resin (R) in the resin part may be in the range of 70% to 100% by mass, in the range of 80% to 100% by mass, or in the range of 90% to 100% by mass.

(Resin (R))

The resin (R) contained in the resin part may be constituted of only one type of resin, or may contain a plurality of types of resins. When the resin (R) contains a plurality of types of resins, 50% by mass or more of the resins constituting the resin (R) needs to satisfy the above condition (the glass transition point Tg). Preferably, all the resins contained in the resin (R) satisfy the above condition (the glass transition point Tg).

The glass transition point Tg of the resin (R) can be determined by nanoscale dynamic viscoelastic measurement (nano-DMA) using the nanoindentation method. For example, a portion of the exterior body is cut out, and the resin part of its cross section is measured. An example of the measurement method will be described in detail with reference to examples. If the resin part contains a filler, the measurement is performed by bringing a triangular pyramid indenter into contact with a portion of the resin part where the filler is not present. While the loss modulus of the resin (R) is measured at each temperature while increasing the temperature, a behavior of the resin (R) increasing and then decreasing in the loss modulus is observed. The temperature at which the loss modulus changes from an increasing state to a decreasing state is set as the glass transition point Tg. That is, the glass transition point Tg of the resin (R) is defined as the temperature at which the loss modulus changes from an increasing state to a decreasing state when the loss modulus of the resin part is measured by nanoscale dynamic viscoelastic measurement using the nanoindentation method while the temperature of the resin part is increased. The loss modulus can be determined by performing dynamic viscoelastic measurement at any five points on the resin part and calculating the average of the measured values, for example.

The glass transition point Tg of the resin (R) may be equal to or lower than 125° C. When the glass transition point Tg of the resin (R) is equal to or lower than 125° C., the exterior body can relieve stress over a wide temperature range and can maintain high sealing performance.

The glass transition point Tg depends on the type, structure, crosslink density, and the like of the resin. For example, the glass transition point Tg tends to decrease with decline in the crosslink density of the resin.

The hardness of the resin part containing the resin (R) is also measured using the nanoindentation method, as with the glass transition point of the resin (R). For example, the hardness of the resin part can be determined by cutting out a portion of the exterior body and performing continuous stiffness measurement on the resin part of its cross section. An example of the measurement method will be described in detail with reference to the examples. If the resin part contains a filler, the measurement is performed by bringing a triangular pyramid indenter into contact with a portion of the resin part where the filler is not present. The hardness can be determined by measuring any five points on the resin part and calculating the average of the measured values, for example. From the viewpoint of maintaining high sealing performance while sufficiently relieving the stress on the exterior body from the capacitor element and the lead terminals at high temperatures, the hardness of the resin part in the temperature range from the glass transition point Tg to 260° C. inclusive may be 0.05 GPa or less, or may be 0.03 GPa or less. In another aspect, the hardness of the resin part in the temperature range from 140° C. to 260° C. inclusive may be 0.05 GPa or less, or may be 0.03 GPa or less.

The hardness of the resin part may be changed by changing the type, structure, crosslink density, and the like of the resin (R), as with the glass transition point Tg. For example, the hardness tends to decrease when the distance between crosslink points of the resin (R) contained in the resin part is increased.

The resin (R) is not particularly limited as long as it has the above-described properties. For example, the resin (R) may be a thermosetting resin or a thermoplastic resin.

Examples of the thermosetting resin include epoxy resin, phenol resin, urea resin, polyimide resin, polyamideimide resin, polyurethane resin, diallyl phthalate resin, unsaturated polyester resin, and the like. As the resin (R), one of these resins may be used alone, or two or more of them may be used in combination.

Examples of the thermoplastic resin include polyphenylene sulfide (PPS), polybutylene terephthalate (PBT), and the like. As the resin (R), one of these resins may be used alone, or two or more of them may be used in combination.

The resin (R) may contain an epoxy resin or may be an epoxy resin. The epoxy resin is excellent in electrical insulation, water resistance, chemical resistance, and the like, and makes it easy to control the glass transition point Tg of the resin (R) and the hardness of the resin part. The epoxy resin is generally obtained by a crosslinking reaction between a base agent, which is a monomer or polymer (prepolymer) having an epoxy group, and a curing agent. The base agent may be a prepolymer such as a polyaromatic epoxy resin, a biphenyl epoxy resin, a cresol novolac epoxy resin, or a dicyclopentadiene epoxy resin. The polyaromatic epoxy resin is an epoxy resin having a plurality of polycyclic aromatic rings in the main skeleton. The polyaromatic epoxy resin has low viscosity at high temperatures. Therefore, when the lead terminals are subjected to blast treatment, for example, the strength of adhesion between the exterior body containing the polyaromatic epoxy resin and the lead terminals is physically increased due to the anchor effect.

When the resin (R) contains an epoxy resin, the glass transition point Tg of the resin (R) depends on the crosslink density and structure of the epoxy resin. Therefore, the glass transition point Tg can be controlled by the types of the base agent and the curing agent, the compound ratio of the base agent and the curing agent, the molecular weight of the base agent, or the like, for example. When the concentration of the functional group (epoxy group) of the base agent is low, or when the epoxy equivalent of the base agent is low, for example, the crosslink density of the epoxy resin tends to be low, and the glass transition point Tg tends to be low. In addition, for base agents having the same skeleton structure, the base agent with a smaller number of nuclei has a smaller number of functional groups and has a lower crosslink density of the epoxy resin, so that the glass transition point Tg is likely to be low. Similarly, for base agents having the same epoxy equivalent, the base agent with a smaller number of nuclei has a smaller number of functional groups and has a lower crosslink density of the epoxy resin, so that the glass transition point Tg tends to be low. On the other hand, when the skeleton structure of the epoxy resin is highly rigid or symmetrical, the glass transition point Tg tends to be high. Similarly, when the epoxy resin has a bulky substituent, the glass transition point Tg also tends to be high.

The curing agent is not particularly limited and is selected as appropriate according to the type of the base agent. Examples of the curing agent include polyfunctional or polyaromatic novolac curing agents such as phenol novolac, acid anhydride curing agents such as tetrahydrophthalic anhydride and hexahydrophthalic anhydride, amine curing agents such as ethylenediamine and aromatic amine, and the like. In order to obtain the resin (R) by reacting the base agent and the curing agent, a polymerization initiator, a catalyst, and the like may be used in addition to the base agent and the curing agent. The polymerization initiator, catalyst, and the like may also be selected as appropriate according to the type of the base agent. Examples of the catalyst include phosphorus compounds such as triphenylphosphine and its modified products, amines, imidazoles, and the like.

(Filler)

The exterior body may further contain a filler dispersed in the resin part. The exterior body may be constituted of a resin part and a filler dispersed in the resin part. The filler is dispersed in the resin part containing the resin (R). The filler is not particularly limited, and a known filler can be used. For example, an insulating filler such as insulating particles or insulating fibers is used. Examples of insulating materials constituting the insulating filler include insulating compounds such as silica, alumina, aluminum nitride, and boron nitride, glass, and mineral materials (such as talc, mica, and clay). The exterior body may contain one type or two or more types of fillers.

When the content of the filler in the exterior body is high, the strength of the exterior body is high and the shrinkage rate during molding is also low. In addition, the moisture absorption of the exterior body is low and the flame retardancy of the exterior body is high. On the other hand, when the content of the filler is low, the adhesion of the exterior body to the capacitor element and the lead terminals is high. In addition, the elasticity of the exterior body is low and the measured hardness of the exterior body is likely to be low.

When the content of the filler is low, the resin part easily fills the gaps between the capacitor element and the lead terminals. When a plurality of capacitor elements are included, the resin part also easily fills the gaps between the capacitor elements. In order to achieve these characteristics in a well-balanced manner, the content of the filler in the exterior body is preferably in the range of 75% by mass to 90% by mass. The content of the filler may be 78% by mass or more or may be 86% by mass or less.

When the content of the filler in the exterior body is the same, the smaller the particle diameter of the filler, the easier it is to relieve stress, since the resin (R) present in the filler plays the role of a buffer material. Accordingly, the entire exterior body can relieve greater stress. When the particle diameter of the filler is small, the resin part more easily fills the gaps between the capacitor element and the lead terminals. When a plurality of capacitor elements are included, the resin part is also more likely to fill the gaps between the capacitor elements. Therefore, the maximum particle diameter of the filler may be 100 μm or less (for example, 55 μm or less). Setting the maximum particle diameter to 55 μm or less makes it easier to relieve stress as described above. The maximum particle diameter here refers to the particle diameter of the largest particle among the filler particles contained in the exterior body. The maximum particle diameter is determined by capturing an image of the cross section of the exterior body, selecting any 100 particles in the image, and measuring the cross-sectional areas of the particles. Among the equivalent circles having the same areas as the cross-sectional areas of the particles, the diameter of the largest equivalent circle is the maximum particle diameter.

The solid electrolytic capacitor according to the present embodiment has high heat resistance, and has the sealing property of the exterior body maintained even at high temperatures. Therefore, the intrusion of moisture and oxygen into the solid electrolytic capacitor is suppressed, and the conductive polymer in the solid electrolyte contained in the capacitor element is less likely to deteriorate. Therefore, the electrostatic capacitance and ESR of the solid electrolytic capacitor are maintained even when it is exposed to high temperatures.

The average value of the electrostatic capacitance change rate represented by the following formula may be −5.0% or more:

electrostatic capacitance change rate (%)=100×(C1−C0)/C0, where C0 is the initial electrostatic capacitance and C1 is the electrostatic capacitance after heating at 125° C. for 7000 hours. The average value may be −3.0% or more, or −1.0% or more. The average value here is the average value of the electrostatic capacitance change rates of at least 60 (for example, 100) solid electrolytic capacitors. The electrostatic capacitance can be measured using an LCR meter, for example. The electrostatic capacitance change rate of one solid electrolytic capacitor is preferably −5.0% or more, and more preferably −3.0% or more.

The solid electrolytic capacitor according to the present embodiment includes a capacitor element, lead terminals, and an exterior body, and may include other components as necessary. An example of a configuration of the solid electrolytic capacitor will be described below. However, the configuration of the solid electrolytic capacitor is not limited to the following example. Known components may be applied to components other than the components characteristic of the solid electrolytic capacitor according to the present embodiment. The solid electrolytic capacitor may include a case made of metal or the like instead of the above-described exterior body.

[Capacitor Element]

The solid electrolytic capacitor has one or more capacitor elements. The number of capacitor elements included in the solid electrolytic capacitor is determined according to the application. When two or more capacitor elements are included, the capacitor elements are usually laminated. In this case, an anode lead terminal is connected to an anode laminate part in which a plurality of anode parts are laminated, and a cathode lead terminal is connected to a cathode laminate part in which a plurality of cathode parts are laminated.

(Anode Body)

The anode body may contain a valve metal, an alloy containing a valve metal, a compound containing a valve metal, and the like. One of these materials may be used alone or two or more of them may be used in combination. As the valve metal, aluminum, tantalum, niobium, and titanium are preferably used, for example. The surface of the anode body may have a porous structure. For example, the porous structure can be obtained by roughening the surface of a substrate containing a valve metal (such as a foil-shaped or plate-shaped substrate) by etching or the like. The anode body may also be a molded body of particles containing a valve metal or a sintered body thereof. When the anode body is a sintered body, the anode part may include an anode wire partially embedded in the sintered body. In that case, one end of the anode lead terminal is connected to the anode wire.

(Dielectric Layer)

The dielectric layer is an insulating layer that is formed to cover the surface of at least a portion of the anode body. The dielectric layer is not particularly limited as long as it functions as a dielectric layer, but for example, it is formed by anodizing the valve metal on the surface of the anode body through chemical conversion treatment or the like. In this case, the dielectric layer contains an oxide of the valve metal. For example, when tantalum is used as the valve metal, the dielectric layer contains $Ta_2O_5$, and when aluminum is used as the valve metal, the dielectric layer contains $Al_2O_3$.

(Solid Electrolyte Layer)

The solid electrolyte layer is formed so as to cover at least a portion of the dielectric layer. The solid electrolyte layer includes a conductive polymer. The conductive polymer may be polypyrrole, polythiophene, polyfuran, polyaniline, polyacetylene, polyphenylene, polyphenylenevinylene, polyacene, polythiophenevinylene, or derivatives thereof. Examples of the derivatives include poly(3,4-ethylenedioxythiophene) and the like.

A dopant may be added to the conductive polymer. The dopant can be selected depending on the conductive polymer, and a known dopant may be used. Examples of the dopant include naphthalenesulfonic acid, p-toluenesulfonic acid, polystyrenesulfonic acid, salts thereof, and the like.

The solid electrolyte layer containing a conductive polymer may be formed by polymerizing a monomer as a raw material on the dielectric layer. Alternatively, the solid electrolyte layer containing a conductive polymer may be formed by depositing a liquid containing the conductive polymer on the dielectric layer and then drying the liquid.

(Cathode Extraction Layer)

The cathode extraction layer includes a first layer covering at least a portion of the solid electrolyte layer, and may include the first layer and a second layer covering the first layer. The first layer and the second layer are both conductive layers. The first layer is formed of a layer containing conductive particles, a metal foil, and the like, for example. Examples of the conductive particles include conductive carbon, metal powder, and the like. The second layer is formed of a layer containing metal powder or a metal foil, or the like, for example. The layer containing metal powder is formed by using a composition (metal paste) containing metal powder such as silver particles and a resin (binder resin), for example.

(Adhesive Layer)

The adhesive layer connects the cathode lead terminal and the cathode part. The adhesive layer contains conductive particles. Examples of the conductive particles include metal particles (for example, silver particles). The adhesive layer is formed using a metal paste containing metal particles and a resin.

[Lead Terminal]

The lead terminals include an anode lead terminal and a cathode lead terminal. One-end sides of the anode lead terminal and the cathode lead terminal are sealed by the exterior body together with the capacitor element. One end portion of the anode lead terminal is electrically connected to the anode part of the capacitor element, and the other end portion is exposed to the outside of the exterior body. One end portion of the cathode lead terminal is electrically connected to the cathode part of the capacitor element, and the other end portion is exposed to the outside of the exterior body. The anode lead terminal and the cathode lead terminal exposed from the exterior body are used for solder connection with a substrate on which the solid electrolytic capacitor is to be mounted, or the like.

The anode lead terminal and the cathode lead terminal can be any lead terminals generally used in solid electrolytic capacitors without any particular restrictions. Examples of materials for the anode lead terminal and the cathode lead terminal include metals such as copper or alloys thereof. The surfaces of the anode lead terminal and the cathode lead terminal may be subjected to blasting treatment. The blasting treatment improves the strength of adhesion between the lead terminals and the exterior body, making it difficult for cracks or peeling to occur at the interface.

[Exterior Body]

The exterior body seals the capacitor element, and portions of the anode lead terminal and the cathode lead terminal. As the exterior body, the above-described exterior body is used.

The exterior body can be formed using a molding technique such as injection molding, insert molding, or compression molding. An uncured resin mixture is used for the molding. For example, a resin mixture containing a base agent (monomer, prepolymer, or the like) that is the raw material for the resin (R), a curing agent, a filler, and the like is used. For example, molding is performed by filling the resin mixture into a predetermined position in a predetermined mold so as to cover the capacitor element and one-end portions of the lead terminals. The resin mixture is cured by the molding, whereby the exterior body including the resin part containing the resin (R) is formed.

The method for manufacturing the solid electrolytic capacitor according to the present embodiment is not particularly limited, and may be a known process. For example, the capacitor element is manufactured by a manufacturing method including a step of forming a dielectric layer so as to cover at least a portion of the anode body, a step of forming a solid electrolyte layer so as to cover at least a portion of the dielectric layer, and a step of forming a cathode extraction layer on at least a portion of the solid electrolyte layer. The step of forming the cathode extraction layer includes a step of forming a carbon layer and a step of forming a silver paste layer on at least a portion of the carbon layer, for example. Furthermore, the manufacturing method may include a step of preparing an anode body prior to the step of forming a dielectric layer.

The solid electrolytic capacitor is manufactured by a manufacturing method including a step of electrically connecting the lead terminals to the capacitor element and a step of covering the capacitor element and portions of the lead terminals with the exterior body (sealing step), for example. The solid electrolytic capacitor may be of a wound type, or may be of either a chip type or a laminate type.

A configuration of an example of the solid electrolytic capacitor according to the present embodiment will be described with reference to FIG. 1. The components described above can be applied to the components described below as examples. In addition, the components described below as examples can be modified based on the above description.

FIG. 1 is a cross-sectional view of a schematic structure of an example of a solid electrolytic capacitor 1 according to the present embodiment. The solid electrolytic capacitor 1 includes a capacitor element 2, lead terminals (anode lead terminal 4 and cathode lead terminal 5), and an exterior body 3 that seals portions of the lead terminals and the capacitor element 2. A portion of the anode lead terminal 4 and a portion of the cathode lead terminal 5 are exposed from the exterior body 3. The exterior body 3 is the exterior body described above.

The capacitor element 2 includes an anode body 6 that constitutes an anode part, a dielectric layer 7 that covers the anode body 6, and a cathode part 8 that covers the dielectric layer 7.

The anode body 6 includes a region facing the cathode part 8 and a region not facing the cathode part 8. In the region of the anode body 6 not facing the cathode part 8, an insulating separation layer 13 is formed at a portion adjacent to the cathode part 8, in a belt shape so as to cover the surface of the anode body 6, thereby restricting contact between the cathode part 8 and the anode body 6. Another portion of the region of the anode body 6 not facing the cathode part 8 is electrically connected to the anode lead terminal 4 by welding. The cathode lead terminal 5 is electrically connected to the cathode part 8 via an adhesive layer 14 formed of a conductive adhesive.

The cathode part 8 includes a solid electrolyte layer 9 that covers the dielectric layer 7, and a cathode extraction layer 10 that covers the solid electrolyte layer 9. The cathode extraction layer 10 has a carbon layer 11 and a silver paste layer 12.

ADDITIONAL NOTES

The following techniques are disclosed by the above description.

(Technique 1)

A solid electrolytic capacitor including a capacitor element, a lead terminal that is electrically connected to the capacitor element, and an exterior body that seals a portion of the lead terminal and the capacitor element, wherein the exterior body includes a resin part containing a resin, the resin has a glass transition point Tg of 140° C. or less, where the glass transition point Tg is a temperature at which a loss modulus of the resin part measured by nanoscale dynamic viscoelastic measurement using a nanoindentation method changes from an increasing state to a decreasing state, and in a temperature range from the glass transition point Tg to 260° C. inclusive, a hardness of the resin part measured by the nanoindentation method is 0.08 GPa or less.

(Technique 2)

The solid electrolytic capacitor according to Technique 1, wherein the glass transition point Tg of the resin is 125° C. or less.

(Technique 3)

The solid electrolytic capacitor according to Technique 1 or 2, wherein the resin is an epoxy resin.

(Technique 4)

The solid electrolytic capacitor according to any one of Techniques 1 to 3, wherein the exterior body further includes a filler dispersed in the resin part.

(Technique 5)

The solid electrolytic capacitor according to Technique 4, wherein a content of the filler in the exterior body is in a range of 75% by mass to 90% by mass.

(Technique 6)

The solid electrolytic capacitor according to Technique 4 or 5, wherein a maximum particle diameter of the filler is 55 μm or less.

(Technique 7)

The solid electrolytic capacitor according to any one of Techniques 1 to 6, wherein an average value of an electrostatic capacitance change rate represented by the following formula is −5.0% or more:

$$\text{electrostatic capacitance change rate (\%)} = 100 \times (C1 - C0)/C0,$$

where C0 is an initial electrostatic capacitance and C1 is an electrostatic capacitance after heating at 125° C. for 7000 hours.

EXAMPLES

The present disclosure will be specifically described below based on examples, but the present disclosure is not limited to the following examples. In these examples, solid electrolytic capacitors with different exterior bodies were fabricated and evaluated for heat resistance.

(1) Fabrication of Solid Electrolytic Capacitors A1, B1, and B2

Solid electrolytic capacitors A1, B1, and B2 were fabricated by the procedure described below.

(1-1) Fabrication of Capacitor Element (1-a) Fabrication of Anode Body

An anode body was fabricated by etching both sides of an aluminum foil (thickness: 100 μm).

(1-b) Formation of Dielectric Layer

The anode body was immersed in a 0.3 mass % phosphoric acid solution (liquid temperature: 70° C.) and placed under a direct-current voltage of 70 V for 20 minutes to form a dielectric layer containing aluminum oxide ($Al_2O_3$) on the surface of the anode body.

(1-c) Formation of Solid Electrolyte Layer

In the anode body on which the dielectric layer was formed, an insulating resist tape was attached to between the region on which a solid electrolyte layer was to be formed and the region on which a solid electrolyte layer was not to be formed, thereby forming a separation part. An aqueous solution containing pyrrole monomer and p-toluenesulfonic acid was prepared. The concentration of the pyrrole monomer in the aqueous solution was 0.5 mol/L, and the concentration of the p-toluenesulfonic acid in the aqueous solution was 0.3 mol/L. The anode body on which the dielectric layer was formed in step (1-b) above and a counter electrode were immersed in the obtained aqueous solution. In that state, electrolytic polymerization was performed at 25° C. with a polymerization voltage of 3 V (polymerization potential relative to a silver reference electrode) to form a solid electrolyte layer.

(1-d) Formation of Cathode Extraction Layer

The anode body obtained in step (1-c) was immersed in a dispersion liquid in which graphite particles were dispersed in water. The dispersion liquid applied to the anode body was then dried to form a carbon layer on the surface of the solid electrolyte layer. The drying was performed at 150° C. for 30 minutes.

Next, a silver paste containing silver particles and a binder resin (epoxy resin) was applied to the surface of the carbon layer, and the binder resin was cured by heating at 150° C. for 30 minutes to form a silver paste layer. In this manner, a cathode extraction layer constituted of a carbon layer and a silver paste layer was formed, and a cathode part including a solid electrolyte layer and a cathode extraction layer was formed. A capacitor element was fabricated in steps (1-a) to (1-d).

(1-2) Assembly of Solid Electrolytic Capacitor

The cathode part of the capacitor element obtained in step (1-d) was joined to one end portion of the cathode lead terminal with an adhesive layer using a conductive adhesive. One end portion of the anode body protruding from the capacitor element was joined to one end portion of the anode lead terminal by laser welding.

Next, an exterior body was formed around the capacitor element and the lead terminals by molding using resin mixtures 1 to 3 described below. At this time, the other end portion of the anode lead terminal and the other end portion of the cathode lead terminal were exposed from the exterior body. In this manner, the solid electrolytic capacitors A1, B1, and B2 were completed. As materials for the exterior body, the resin mixture 1 was used for the solid electrolytic capacitor A1, the resin mixture 2 was used for the solid electrolytic capacitor B1, and the resin mixture 3 was used for the solid electrolytic capacitor B2. The resin part of the exterior body formed from the resin mixture 1 contained a polyaromatic epoxy resin as the resin (R). The following resin mixtures had fillers dispersed therein.

Resin mixture 1: A resin mixture in which the glass transition point Tg of the resin part formed upon curing is around 125° C. as measured by nano-DMA, and in which the hardness of the resin part is 0.08 GPa or less in the temperature range higher than the glass transition point Tg.

Resin mixture 2: A resin mixture in which the glass transition point Tg of the resin part formed upon curing is around 145° C. as measured by nano-DMA, and in which the hardness of the resin part is greater than 0.08 GPa in the temperature range higher than the glass transition point Tg.

Resin mixture 3: A resin mixture in which the glass transition point Tg of the resin part formed upon curing is around 165° C. as measured by nano-DMA, and in which the hardness of the resin part is greater than 0.08 GPa in the temperature range higher than the glass transition point Tg.

(2) Evaluations

The solid electrolytic capacitors A1, B1, and B2 fabricated as described in (1) were evaluated as described below.

(2-1) Evaluation of Exterior Body (2-a) Glass Transition Point Tg of Resin

Figure 2:
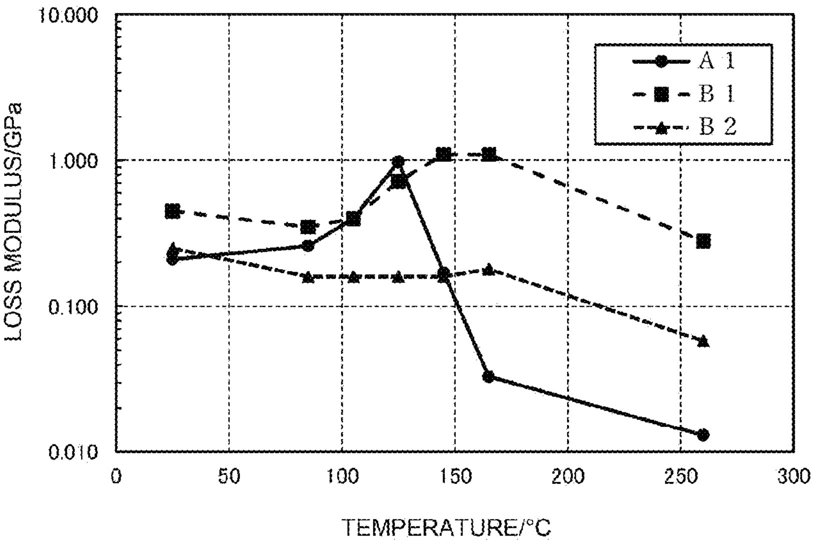
FIG. 2 is a graph showing the relationship between the temperature and loss modulus of a resin contained in an exterior body of the solid electrolytic capacitor.

Portions of the exterior bodies of the solid electrolytic capacitors A1, B1, and B2 were cut out and used as samples. Nanoscale dynamic viscoelastic measurement (nano-DMA) was performed by the nanoindentation method as described above at five points in the cross section of each sample that did not contain filler. Specifically, nanoscale dynamic viscoelasticity (particularly, loss modulus) was measured using a Triboindenter TI950 manufactured by Hysitron, Inc., at room temperature (25° C.), 85° C., 105° C., 125° C., 145° C., 165° C., and 260° C. The measurement was performed under a nitrogen atmosphere while the temperature of the sample was gradually increased. Specifically, the sample was heated at a temperature increase rate of 20° C./min, and after reaching the measurement temperature, the temperature was maintained for 20 minutes, and then the measurement was performed at the measurement temperature. The measurement frequency was 100 Hz. The nanoscale dynamic viscoelastic measurement was performed by the method described below. A diamond triangular pyramid indenter (Berkovich indenter) was brought into contact with the filler-free part (resin part) in the cross section of the sample, and the indenter was caused to generate minute vibration. The response amplitude and phase difference to the vibration were obtained as a function of time, and the stiffness and sample damping were calculated. At each temperature, the loss modulus was calculated using the calculation results of sample damping. The loss modulus at each temperature was determined by averaging the measured values at five points. FIG. 2 shows the calculation results.

When the temperature was raised from 25° C. to 260° C., the loss modulus increased and then decreased. The point at which the loss modulus changed from increasing to decreasing states was determined as the glass transition point Tg. The glass transition points Tg of the resins contained in the exterior bodies of the solid electrolytic capacitors A1, B1, and B2 were 125° C., about 145° C. (temperature in the range of 145° C. to 165° C.), and 165° C., respectively.

(2-b) Hardness of Resin Part

Figure 3:
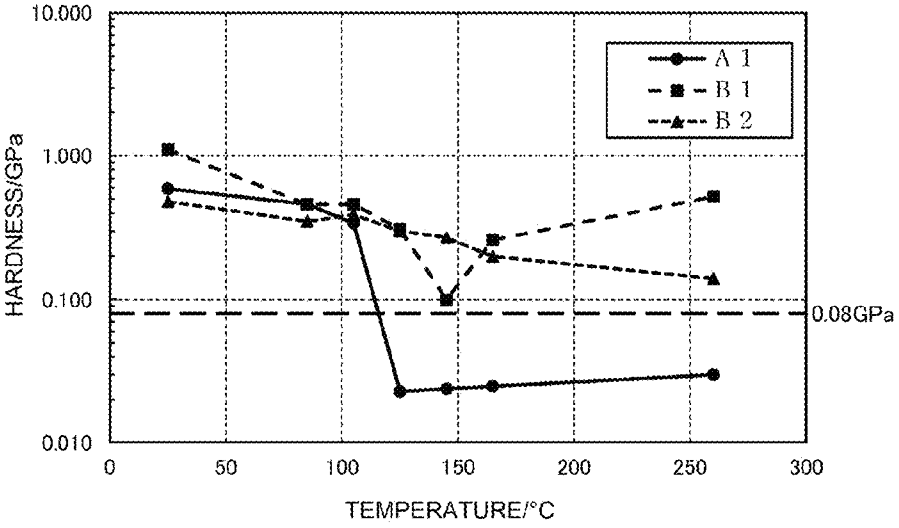
FIG. 3 is a graph showing the relationship between the temperature and hardness of a resin part included in the exterior body of the solid electrolytic capacitor.

Portions of the exterior bodies of the solid electrolytic capacitors A1, B1, and B2 were cut out and used as samples. The hardness was measured at five points in the cross section of the resin part of each sample at room temperature (25° C.), 85° C., 105° C., 125° C., 145° C., 165° C., and 260° C. by continuous stiffness measurement using the nanoindentation method. The measurement was performed using the above-described device and the above-described heating method. The hardness was measured by the method described below. A diamond triangular pyramid indenter (Berkovich indenter) was used to perform indentation load and unload tests by which the load and indentation depth were continuously measured at the part (resin part) in the cross section of the sample that did not contain the filler. Through these tests, a curve relating to the load and the indentation depth was obtained. The hardness was calculated using the projection area of the indentation remaining when the elastic deformation was recovered after indentation and the load. The hardness at each temperature was determined by averaging the measured values at five points. FIG. 3 shows the calculation results.

The hardness of the resin part included in the solid electrolytic capacitor A1 was 0.08 GPa or less in the temperature range from the glass transition point Tg (125° C.) of the resin to 260° C. inclusive. On the other hand, the hardness of the resin parts included in the solid electrolytic capacitors B1 and B2 was higher than 0.08 GPa in the temperature range from the glass transition point Tg of the resin (the resin of the solid electrolytic capacitor B1: about 145° C., the resin of the solid electrolytic capacitor B2: 165° C.) to 260° C. inclusive.

Through the above steps (2-a) and (2-b), it was confirmed that the solid electrolytic capacitor A1 was the solid electrolytic capacitor according to the present embodiment, while the solid electrolytic capacitors B1 and B2 were solid electrolytic capacitors of comparative examples.

(2-2) Evaluation of Solid Electrolytic Capacitors (2-c) Electrostatic Capacitance Change Rate The electrostatic capacitance changes of the solid electrolytic capacitors A1, B1, and B2 at 125° C. were measured by the procedure described below. For the measurement, 100 solid electrolytic capacitors A1, 60 solid electrolytic capacitors B1, and 60 solid electrolytic capacitors B2 were prepared.

In an environment of 20° C., the electrostatic capacitance (μF) of each solid electrolytic capacitor at a frequency of 120 Hz was measured using an LCR meter for four-terminal measurement, as an initial electrostatic capacitance C0 (μF). Then, each solid electrolytic capacitor was heated under the same temperature conditions as those in the reflow treatment according to IPC/JEDEC J-STD-020D (heated at 255° C. or higher, the maximum temperature of 260° C., for 30 seconds). Next, a high-temperature shelf test was performed by which the solid electrolytic capacitor was left in an environment of 125° C. for 7000 hours. Electrostatic capacitance C1 (μF) of the solid electrolytic capacitor was measured in the same manner as C0, immediately after the heat treatment equivalent to the reflow treatment (immediately after reflow) and after a lapse of a predetermined time at the high-temperature shelf test. Using the measured electrostatic capacitances, the change rate of electrostatic capacitance was calculated according to the following formula:

$$\text{Electrostatic capacitance change rate (\%)} = 100 \times (C1 - C0)/C0$$

The electrostatic capacitance change rates of the 100 solid electrolytic capacitors A1 were arithmetically averaged to determine an average value. Similarly, the average electrostatic capacitance change rates of the 60 solid electrolytic capacitors B1 and 60 solid electrolytic capacitors B2 were determined. Table 1 shows the evaluation results. As the degradation of the solid electrolytic capacitor increases, the electrostatic capacitance change rate becomes negative. An electrostatic capacitance change rate being close to 0 (or a large positive value) indicates little degradation of the solid electrolytic capacitor.

TABLE 1

| High-temperature shelf | Average value of electrostatic capacitance change rate (%) | | |
|---|---|---|---|
| test time (hour) | A1 | B1 | B2 |
| Initial stage (20° C.) | 0.00 | 0.00 | 0.00 |
| 0 (immediately after reflow) | 2.34 | 3.54 | −1.10 |
| 750 | 1.50 | 1.66 | −9.05 |
| 1250 | 0.81 | 1.47 | −11.72 |
| 2000 | 0.79 | 0.50 | −14.63 |
| 3000 | 0.38 | −1.42 | −17.41 |
| 4000 | −0.15 | −2.65 | −19.80 |
| 5000 | −0.37 | −5.04 | −22.41 |

TABLE 1-continued

| High-temperature shelf | Average value of electrostatic capacitance change rate (%) | | |
|---|---|---|---|
| test time (hour) | A1 | B1 | B2 |
| 6000 | −0.72 | −6.97 | −23.87 |
| 7000 | −0.90 | −7.97 | −25.60 |

As shown in Table 1, the average value of electrostatic capacitance change rates of the solid electrolytic capacitors A1 after the high-temperature shelf test was −5% or more (that is, $-5.0 \leq 100 \times (C1 - C0)/C0$). If only the high-temperature shelf test was performed without performing heat treatment equivalent to reflow treatment, the degradation of the solid electrolytic capacitor would be less (that is, the value of the electrostatic capacitance change rate would change more toward the positive side). On the other hand, the average values of electrostatic capacitance change rates of the solid electrolytic capacitors B1 and B2 after the high-temperature shelf test were lower than −5%. This means that, unlike the solid electrolytic capacitors B1 and B2, the solid electrolytic capacitors A1 experienced less decrease in electrostatic capacitance even when being exposed to high temperatures for a long period of time.

(2-d) ESR Change Rate

The changes in equivalent series resistance (ESR) of the solid electrolytic capacitors A1, B1, and B2 at 125° C. were measured by the following procedure.

In an environment of 20° C., the ESR (mΩ) of each solid electrolytic capacitor at a frequency of 120 kHz was measured using an LCR meter for four-terminal measurement, as an initial ESR (E0) (mΩ). Then, each solid electrolytic capacitor was heated under the same temperature conditions as those in the reflow treatment in accordance with IPC/JEDEC J-STD-020D (heating at 255° C. or higher, the maximum temperature of 260° C., for 30 seconds). After a lapse of a predetermined time, the ESR (E1) (mΩ) was measured in the same manner as E0. Using the measured electrostatic capacitances, the change rate of ESR was determined by the following formula:

$$ESR \text{ change rate } (\%) = 100 \times (E1 - E0)/E0$$

The ESR change rates of 100 solid electrolytic capacitors A1 were arithmetically averaged to determine an average value. Similarly, the average value of ESR change rates of 60 solid electrolytic capacitors B1 and the average value of ESR change rates of 60 solid electrolytic capacitors B2 were determined. Table 2 shows the calculation results. As the degradation of the solid electrolytic capacitor is large, the ESR change rate increases. The lower the ESR change rate, the less degradation of the solid electrolytic capacitor.

TABLE 2

| High-temperature shelf | Average value of ESR change rate (%) | | |
|---|---|---|---|
| test time (hour) | A1 | B1 | B2 |
| Initial stage (20° C.) | 0.00 | 0.00 | 0.00 |
| 0 (immediately after reflow) | 1.88 | −3.54 | 7.57 |
| 750 | 5.11 | 3.00 | 19.16 |
| 1250 | 11.88 | 15.52 | 27.00 |
| 2000 | 17.72 | 47.75 | 44.75 |

TABLE 2-continued

| High-temperature shelf | Average value of ESR change rate (%) | | |
|---|---|---|---|
| test time (hour) | A1 | B1 | B2 |
| 3000 | 32.28 | 122.56 | 82.78 |
| 4000 | 23.61 | 485.41 | 143.57 |
| 5000 | 34.72 | 928.05 | 249.56 |
| 6000 | 47.56 | 1489.61 | 384.37 |
| 7000 | 54.48 | 2620.55 | 547.46 |

As shown in Table 2, the ESR change rate of the solid electrolytic capacitor A1 was significantly lower than the ESR change rates of the solid electrolytic capacitors B1 and B2.

(2-e) Airtightness

The solid electrolytic capacitors A1, B1, and B2 was evaluated for airtightness by the following procedure. Each solid electrolytic capacitor was heat-treated under the same temperature conditions as those in the reflow treatment according to IPC/JEDEC J-STD-020D (heating at 255° C. or higher, the maximum temperature of 260° C., for 30 seconds). Then, each solid electrolytic capacitor was subjected to temperature shock treatment. Specifically, each solid electrolytic capacitor was placed in an environment of −55° C., and then in an environment of 125° C., and this operation was repeated 100 times to perform the temperature shock treatment. Each solid electrolytic capacitor was subjected to a gross leak test at an initial stage (before the heat treatment), after the heat treatment, and after the temperature shock treatment. Specifically, each solid electrolytic capacitor was placed in a small capsule, and a minute pressure drop was caused by the internal pressure of the small capsule leaking into the exterior body and was measured. Then, a solid electrolytic capacitor whose pressure change at this time was larger than a predetermined value was determined as defective in airtightness, and the airtightness defective rate (%) was calculated.

The above test was carried out on 100 solid electrolytic capacitors A1, 100 solid electrolytic capacitors B1, and 100 solid electrolytic capacitors B2, and the airtightness defect rates were calculated by the following formula:

$$\text{airtightness defect rate } (\%) = 100 \times (\text{the number of solid electrolytic capacitors determined as defective in airtightness})/(\text{the number of solid electrolytic capacitors used in the test}).$$

The airtightness defect rates of the solid electrolytic capacitors A1, B1, and B2 were calculated at an initial stage, after the heat treatment, and after the temperature shock treatment. Table 3 shows the calculation results. In Table 3, the overall airtightness defect rate refers to the proportion (%) of the total number of solid electrolytic capacitors that were determined as defective in airtightness at an initial stage, after the heat treatment, and after the temperature shock treatment to the number of solid electrolytic capacitors tested at an initial stage (the 100 solid electrolytic capacitors A1, the 100 solid electrolytic capacitors B1, and the 100 solid electrolytic capacitors B2).

TABLE 3

| | Airtightness defect rate (%) | | |
|---|---|---|---|
| | A1 | B1 | B2 |
| Initial stage | 0 | 0 | 30 |
| After heat treatment | 0 | 1 | 60 |
| After temperature shock treatment | 0 | 0 | 7 |
| Overall | 0 | 1 | 74 |

As shown in Table 3, the solid electrolytic capacitors A1 had high airtightness, and maintained the airtightness even after the heat treatment and the temperature shock treatment, while the solid electrolytic capacitors B1 and B2 showed a decrease in airtightness. In particular, it has been revealed that some of the solid electrolytic capacitors B2 already had defective airtightness at the initial stage.

As described above, the solid electrolytic capacitors A1 are solid electrolytic capacitors according to the present embodiment. It has been confirmed that the solid electrolytic capacitors A1 suppressed reduction in electrostatic capacitance and increase in ESR even when being exposed to high temperatures.

In each solid electrolytic capacitor A1, the resin contained in the exterior body was in a rubber state at 125° C. when the high-temperature storage test was performed, and the hardness of the resin part containing the resin was also low at 0.08 GPa or less. Therefore, it is considered that the stress applied to the exterior body from the capacitor element and the lead terminals was relieved by the entire exterior body, the occurrence of cracks and peeling was suppressed, and the airtightness was improved. It is surmised that this allowed the exterior body to maintain high sealing performance even at high temperatures.

On the other hand, it is considered that, in the solid electrolytic capacitors B1 and B2, the stress applied to the exterior body was not sufficiently relieved, and cracks and peeling occurred inside the exterior body and at the interfaces between the exterior body and the capacitor element and between the exterior body and the lead terminals, thereby resulting in reduction of airtightness. It is considered that the reduced sealing performance of the exterior body lowered the conductivity of the solid electrolyte layer in the capacitor element, causing a decrease in the electrostatic capacitance and an increase in the ESR of the solid electrolytic capacitors B1 and B2.

INDUSTRIAL APPLICABILITY

The solid electrolytic capacitor according to the present disclosure has high sealing performance of the exterior body even at high temperatures, and is capable of suppressing a decrease in electrostatic capacitance and an increase in ESR. Therefore, the solid electrolytic capacitor according to the present disclosure can be used in a variety of applications requiring high reliability.

Although the present invention has been described with respect to the presently preferred embodiments, such disclosure should not be interpreted as limiting. Various variations and modifications will no doubt become apparent to those skilled in the art to which the present invention pertains upon reading the above disclosure. Therefore, the appended claims should be interpreted to cover all variations and modifications without departing from the true spirit and scope of the present invention.

REFERENCE NUMERALS

1: electrolytic capacitor
2: capacitor element
3: exterior body
4: anode lead terminal
5: cathode lead terminal
6: anode body
7: dielectric layer
8: cathode part
9: solid electrolyte layer
10: cathode extraction layer
11: carbon layer
12: silver paste layer
13: separation layer
14: adhesive layer

What is claimed is:

1. A solid electrolytic capacitor comprising a capacitor element, a lead terminal that is electrically connected to the capacitor element, and an exterior body that seals the capacitor element and a portion of the lead terminal, wherein the exterior body includes a resin part containing a resin, the resin has a glass transition point Tg of 140° C. or less, where the glass transition point Tg is a temperature at which a loss modulus of the resin part measured by nanoscale dynamic viscoelastic measurement using a nanoindentation method changes from an increasing state to a decreasing state, and in a temperature range from the glass transition point Tg to 260° C. inclusive, a hardness of the resin part measured by the nanoindentation method is 0.08 GPa or less.

2. The solid electrolytic capacitor according to claim 1, wherein the glass transition point Tg of the resin is 125° C. or less.

3. The solid electrolytic capacitor according to claim 1, wherein the resin is an epoxy resin.

4. The solid electrolytic capacitor according to claim 1, wherein the exterior body further includes a filler dispersed in the resin part.

5. The solid electrolytic capacitor according to claim 4, wherein a content of the filler in the exterior body is in a range of 75% by mass to 90% by mass.

6. The solid electrolytic capacitor according to claim 4, wherein a maximum particle diameter of the filler is 55 μm or less.

7. The solid electrolytic capacitor according to claim 1, wherein an average value of an electrostatic capacitance change rate represented by the following formula is −5.0% or more:

$$\text{electrostatic capacitance change rate (\%)} = 100 \times (C1 - C0)/C0,$$

where C0 is an initial electrostatic capacitance and C1 is an electrostatic capacitance after heating at 125° C. for 7000 hours.

* * * * *